United States Patent Office 2,789,994
Patented Apr. 23, 1957

2,789,994

POLYHYDRIC ALCOHOL-ORGANOTIN DERIVATIVES

Hugh E. Ramsden, Metuchen, and Clarence Kenneth Banks, Westfield, N. J., assignors to Metal & Thermit Corporation, New York, N. Y., a corporation of New Jersey No Drawing. Application July 11, 1952, Serial No. 298,461

2 Claims. (Cl. 260—429.7)

This invention relates to the preparation of organotin derivatives of polyhydric alcohols having utility as stabilizing agents for resins and the like, particularly for halogen containing materials.

In accordance with this invention, the group of organotin derivatives of polyhydric alcohols may be generally designated as condensation products of organotin compounds with polyhydric alcohols. More particularly these compounds may be illustrated by the following formula:

1.

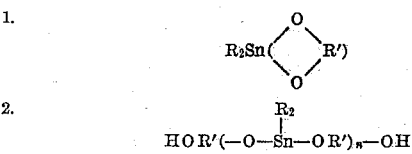

2.  $\text{HOR'}(-\text{O}-\overset{R_2}{\underset{|}{\text{Sn}}}-\text{OR'})_n-\text{OH}$ wherein R is an alkyl, aryl or aralkyl group, R' is a saturated or unsaturated, hydroxy substituted or unsubstituted, divalent aliphatic group and $n$ equals 1–9. Thus R may be any organic radical such as butyl, methyl, lauryl, phenyl, etc. Similarly, R' may be derived from any polyalcohol containing at least two free hydroxyl groups one of which may be a secondary hydroxyl radical. Suitable polyhydric alcohols containing a secondary hydroxyl radical are propylene glycol 1, 2; butane-diol 1, 3; 2 methyl pentane-diol 1, 3; styrene glycol; glycerin, glyceryl - mono - oleate, mono - laurate, mono - stearate, mono-ricinoleate, etc. Other suitable glycols are ethylene glycol; propylene glycol 1, 3; tetramethylene glycol; pentamethylene glycol; diethylene glycol; triethylene glycol, etc. The 1, 2- or 1, 3-glycols are preferred for the formation of the aforedefined cyclic organotin derivatives. Other suitable polyhydric alcohols are mannitol, sorbitol, glucose, etc.

The organotin derivatives of this invention are stabilizers for resins, particularly vinyl chloride containing resins in quantities as low as one quarter of one percent by weight of the resin. This stabilizing property is equally applicable to resin-plasticizer compositions, such as those containing the phthalate type plasticizers.

These compounds may be prepared in high yield and purity by reacting an organotin halide with a polyhydric alcohol having at least two free hydroxyl groups, and recovering a reaction product having the aforesaid formulae. More specifically, an organotin dihalide may be condensed with a polyhydric alcohol having at least two free hydroxyl groups to produce either the monomeric or polymeric type reaction product described above or a mixture of both reaction products. It is necessary to conduct this reaction in the presence of a basic acid acceptor or an alkaline neutralizing agent such as sodium carbonate, bicarbonate or hydroxide. These substances accept the anion, e. g. chloride, formed during the condensation reaction and are not deleterious to the polyhydric alcohol when used in the prescibed manner.

The reaction for the formation of the aforesaid organotin derivatives using organotin dihalide, wherein X represents a halogen such as chlorine, bromine or iodine is clearly illustrated by the following equations:

1.

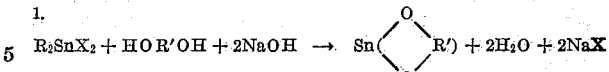

2.

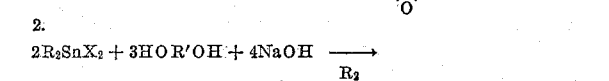

These equations show that the reaction occurs between the hydroxy radicals and the organotin dihalide whereby the halide acid splits off and is neutralized by the sodium hydroxide, and a chemical bond is formed between the tin and the oxygen. Equation 1 illustrates the formation of the cyclic monomer, a substituted stanna-dioxolane, when utilizing equimolecular amounts of each reactant; since both the tin compound and the glycol are bifunctional, polymeric forms are sometimes formed. Equation 2 shows the formation of another type of monomeric product which sometimes results from the reaction of 2 molecules of organotin compound with 3 molecules of polyhydric alcohol. Except under special conditions it is probable that the product of a given reaction consists of a mixture of monomers with various polymeric forms.

Any suitable reaction temperatures may be employed. It is ordinarily preferred to use elevated temperatures, more particularly above 100° C., because under these conditions the water formed by the condensation reaction passes off as vapor allowing the reaction to proceed to completion. If preferred, the main part of the reaction may be carried out at lower temperatures, even as low as room temperature, provided that the reaction mixture is subsequently heated above 100° C. or that the water is removed from the end product by other suitable means.

Another embodiment of this invention is the use of inert organic solvents as the medium for the reaction, such as toluene, benzene, etc. The presence of such solvent facilitates the desired reaction and the removal of water. The solvent may be eliminated from the reaction product at the completion of the reaction by any suitable means. This may be accomplished by vaporizing the solvent under vacuum at elevated temperatures, or by decantation from the crystalline solid reaction product, or by other suitable means.

According to the procedure of this invention these organotin derivatives of polyhydric alcohols can be obtained in almost theoretical yields. These yields are indicative of the substantially complete utilization of the reactants in the formation of the final reaction product which may exist as the monomer or polymer or their admixture.

The following examples are further illustrative of the method of preparing these organotin derivatives of polyhydric alcohols, and it will be understood that the invention is not limited thereto:

EXAMPLE I 303.7 gm. dibutyl tin dichloride (1 mole) are heated in a toluene solution with one mole of propylene glycol, in the presence of sodium carbonate (in excess of one mole). After all the water and carbon dioxide has been evaporated, the mixture is filtered and cooled. The reaction product crystallizes out and is filtered off. The end product, dibutyl methyl stanna-dioxolane,

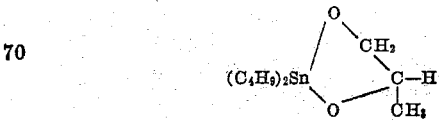

melts at 182° C., yielding a 94% recovery (including that from the stripped mother liquor) and analyzing 37.3% Sn (38.8% theoretical yield), and 0.02% chlorine.

EXAMPLE II

Dibutyl tin dichloride (.5 mole) and ethylene glycol (3 moles) are heated while agitating at a temperature above about 100° C. in the presence of about 1 mol. NaOH. A small amount of toluene is present to assist in the removal of water by means of a Barrett moisture trap and reflux condenser. After the water is removed, the mixture is filtered and cooled to a crystalline slurry. The crystals are freed of the excess glycol by means of a basket centrifuge such as a basket centrifuge. The crystals are recrystallized from toluene and show the following analysis: crude crystals: 36.1% Sn; 215-218° C. M. P. (U. C.); recrystallized: 36.95% Sn; 220-226° C. M. P.; analysis showed the product to be:

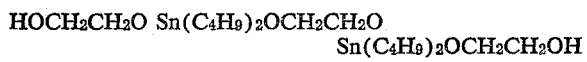

EXAMPLE III

Dimethyl tin dichloride (0.25 mole), ethylene glycol (0.25 mole), NaOH (0.5 mole) and about 200 ml. toluene are treated as in Example II. The resultant product $(CH_3)_2Sn(OCH_2CH_2O)$, is a white powder weighing 49.7 gms. Analysis: 56.4% Sn, theoretical 56.8% Sn.

EXAMPLE IV

Dibutyl tin dichloride (0.25 mole), butane diol-1, 3 (0.25 mole) and 50 ml. toluene are agitated and heated in the presence of 0.5 mol sodium hydroxide. The water formed during the reaction was removed. The sodium chloride formed was filtered off and the toluene was removed by vacuum distillation. The resultant product

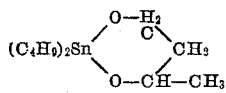

which was liquid at 130° C. solidified to a light tan solid, weighing 77.0 gms., and was recrystallized from toluene, giving the following analysis: crude—36.1% Sn; recrystallized—40.2% Sn; theoretical—37% Sn.

EXAMPLE V

Dibutyl tin dichloride (0.25 mole), diethylene glycol (0.25 mole), 50 ml. of toluene and .5 mol NaOH are treated according to the process of Example IV. The resultant product $(C_4H_9)_2Sn(OCH_2-CH_2OCH_2CH_2O)$, was a viscous mass, weighing 80.1 gms. and analyzed 33.9% Sn.

EXAMPLE VI 0.237 mole dibutyl tin dichloride, 0.237 mole styrene glycol, 0.5 mol NaOH and 200 ml. toluene are heated and stirred under reflux until substantially all the water formed during the reaction is removed. The mixture is filtered hot, cooled and the crystalline product recovered by filtration and washed with cold toluene. The resultant product weighs 69.3 gms. and consists of fine, white crystals having a melting point of 188-190° U. C. and analyzing 32.2% Sn (theoretical—32.2% Sn).

EXAMPLE VII 0.25 mole dibutyl tin dichloride, 0.25 mole glyceryl mono-oleate (commercial product Glyco Products S-1096), 0.5 mol NaOH and 75 ml. toluene are treated according to the process of Example VI. The resultant product was a light colored, viscous liquid weighing 140 gms. and analyzing 20.2% Sn (theoretical 20.3% Sn), consisting of a mixture of both the monomer and polymer of the organotin derivative of glyceryl mono-oleate.

EXAMPLE VIII 0.25 mole dibutyl tin dichloride, 0.25 mole glyceryl mono-laurate (commercial product of Glyco Products S-1062) 0.5 mol NaOH and 100 ml. toluene are treated in accordance with the process of Example VI. The resultant product was a light brown, viscous liquid weighing 125 gms. and containing 23.03% Sn.

EXAMPLE IX 0.50 mole dibutyl tin dichloride, 0.5 mole propylene glycol and 150 ml. toluene are stirred and heated to room temperature. Solution of the dichloride caused a cooling effect. One mole of sodium hydroxide (as a 31% aqueous solution) was subsequently added over a ten minute period. The mixture was then heated and stirred under reflux until substantially all the water was removed by means of a Barrett moisture trap. Heating was continued for 8 additional hours. Thereafter, 200 ml. toluene were added and the mixture was filtered hot. Upon cooling, crystals were deposited, which were filtered off, weighing 65.3 gms. and containing 38.3% Sn.

The organotin derivatives of polyhydric alcohols prepared in accordance with this invention will function as excellent stabilizers for resin compositions, particularly vinyl chloride containing resin compositions containing plasticizers, and when intimately dispersed therein, will provide plastic compositions of improved resistance to heat deterioration. Excellent films are obtained from the aforesaid plastic compositions which exhibit a high degree of stability. The optimum concentration of the aforesaid organotin derivatives, useful as a stabilizer is about 0.25-8% based on the weight of the vinyl resin. The resin composition containing this concentration of stabilizer produces a stable plastic film, which does not darken at elevated temperatures as evidenced by the results of the heat tests in Table I.

The vinyl resins employed were polyvinyl chloride resins. The stabilizer was incorporated into a mixture of 100 parts by weight of resin and 50 parts by weight of diethyl hexyl phthalate plasticizer.

The mixture was then milled for 5 minutes on a two-roll differential speed mill heated to 320 to 325° C., and removed as a sheet. Portions of the sheet were then placed in a single cavity mold (6" by 6" by 40 mils), preheated to 275° F. The mold was placed on a Preco press and raised to 320° F. under 10,000 pounds total pressure. When the mold reached 320° F. the pressure was increased to 40,000 pounds and held until the temperature reached 330° F. This procedure required five to five and one-half minutes. The mold and press platens were then cooled and the pressed sheet removed.

The pressed sheet was cut into one inch by six-inch strips and placed in clips on a tray so that the strips would hang vertically. The tray was then placed in a circulating air oven held at 320° F. Samples were recovered after one hour, two hours, three hours, and four hours of heat aging. Samples were rated visually, the degree of stability of the vinyl chloride resin film being represented by the depth of colorations.

*Table I*

| stabilizer | color after heat aging | for no. of hours |
|---|---|---|
| None | brown-black | less than 1 hr. |
| product of Ex. 3 | light yellow | 3 hrs. |
| product of Ex. 5 | do | 3 hrs. |

This table discloses the unusual stabilizing activity of these organotin derivatives of polyhydric alcohols in comparison to a resin without such stabilizer.

Fadeometer light tests were performed on films made by mixing 100 parts of polyvinyl chloride and 40 parts of di-2-ethyl hexyl phthalate, and 1 part of the stabilizer of Example VIII. This mixture was milled for 5 minutes at 320–325° F. on a 2-roll differential speed mill. The sheet was then pressed at a temperature of 320° F., between two chrome plated sheets of steel on a Preco press at 40,000 lbs. total pressure into a sheet 4–6 mils thick. This sheet was cut to fit Mask No. SL–8A and placed in an Atlas Electric Devices Company Fadeometer.

|  | hours | appearance |
|---|---|---|
| stabilized film | 280 | few small specks. |
| unstabilized film | 72 | seriously discolored and embrittled. |

Other uses of these organotin derivatives are as stabilizers for other chlorinated materials, as rubber accelerators, rubber anti-oxidants, lube oil additives, and polymerization accelerators.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A method of preparing compounds having the formula

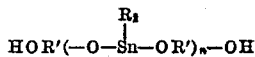

wherein R is selected from the group consisting of alkyl and phenyl radicals, R' is a residue of a polyhydric alcohol selected from the group consisting of alkyl polyhydric alcohols and styrene glycol and $n$ equals 1–9, which comprises reacting an organotin dihalide with a slight excess of a polyhydric aliphatic alcohol having at least two free hydroxyl groups in the presence of a neutralizing agent selected from the group consisting of sodium carbonate, sodium bicarbonate and sodium hydroxide and a solvent selected from the group consisting of toluene and benzene, removing the water formed during said reaction and recovering said organotin compounds.

2. A method of preparing a product having the formula $$HOC_2H_4[-O-Sn(C_4H_9)_2-O-C_2H_4]_2-OH$$

which comprises reacting .5 moles dibutyltin dichloride with 3 moles ethylene glycol in the presence of about 1 mole sodium hydroxide and toluene, removing the water formed during said reaction and recovering the organotin product.

References Cited in the file of this patent
UNITED STATES PATENTS

| 2,583,084 | Burt | Jan. 22, 1952 |
| 2,626,953 | Mack et al. | Jan. 27, 1953 |